United States Patent
Pekoz et al.

(10) Patent No.: US 10,516,452 B1
(45) Date of Patent: Dec. 24, 2019

(54) USING ARTIFICIAL SIGNALS TO MAXIMIZE CAPACITY AND SECRECY OF MULTIPLE-INPUT MULTIPLE-OUTPUT (MIMO) COMMUNICATION

(71) Applicants: Berker Pekoz, Tampa, FL (US); Mohammed Hafez, Lutz, FL (US); Selcuk Kose, Tampa, FL (US); Huseyin Arslan, Tampa, FL (US)

(72) Inventors: Berker Pekoz, Tampa, FL (US); Mohammed Hafez, Lutz, FL (US); Selcuk Kose, Tampa, FL (US); Huseyin Arslan, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 16/239,372

(22) Filed: Jan. 3, 2019

Related U.S. Application Data

(60) Provisional application No. 62/682,421, filed on Jun. 8, 2018.

(51) Int. Cl.
*H04B 7/0456* (2017.01)
*H04B 7/0417* (2017.01)
(Continued)

(52) U.S. Cl.
CPC .......... *H04B 7/046* (2013.01); *H04B 7/0417* (2013.01); *H04L 1/0042* (2013.01); *H04L 25/0204* (2013.01); *H04B 7/0626* (2013.01)

(58) Field of Classification Search
CPC .... H04B 7/0482; H04B 7/046; H04B 7/0417; H04L 1/0042; H04L 25/0204

(Continued)

(56) References Cited

U.S. PATENT DOCUMENTS

| 7,194,237 B2* | 3/2007 | Sugar | H04B 7/0434 375/299 |
| 7,539,253 B2* | 5/2009 | Li | H04B 7/0417 375/260 |

(Continued)

OTHER PUBLICATIONS

Peng et al., Artificial Noise Based Security Algorithm for Multi-User MIMO System. Communications and Network. 2013. vol. 5: 194-199.

(Continued)

*Primary Examiner* — James M Perez
(74) *Attorney, Agent, or Firm* — Molly L. Sauter; Smith & Hopen, P.A.

(57) ABSTRACT

A system and method for increasing the capacity of a Multiple-Input Multiple-Output (MIMO) system at desired user's locations and reducing the capacity at locations, other than that of the desired user, while also providing secrecy. Knowing the channel coefficient between each transmitter and receiver antenna pair at the transmitter, the method of the present invention calculates the artificial signal that minimizes the Euclidean distance between the desired and received data symbols if the precoding/combining matrix pair from the set that has the minimum Euclidean distance to the singular value decomposition (SVD) of the channel matrix is used for transmission and reception. The artificial signal may be fed to the precoder, instead of the actual desired data symbols, or may be transmitted directly to reduce computational complexity, power consumption and processing delay if the hardware configuration allows.

20 Claims, 8 Drawing Sheets

(51) Int. Cl.
*H04L 1/00* (2006.01)
*H04L 25/02* (2006.01)
*H04B 7/06* (2006.01)

(58) Field of Classification Search
USPC .............................. 375/259–285, 295–352
See application file for complete search history.

(56) References Cited

U.S. PATENT DOCUMENTS

| | | | |
|---|---|---|---|
| 7,609,780 B2* | 10/2009 | Sadowsky | H04B 7/0636 375/267 |
| 7,616,695 B1* | 11/2009 | Sarrigeorgidis | H04L 25/0204 375/260 |
| 7,680,461 B2* | 3/2010 | Takano | H04B 7/0615 370/328 |
| 7,688,910 B2* | 3/2010 | Takano | H04B 7/0854 375/260 |
| 7,881,395 B2* | 2/2011 | Lee | H04B 7/0671 375/267 |
| 7,885,349 B2* | 2/2011 | Lee | H04B 7/0417 370/210 |
| 7,957,450 B2* | 6/2011 | Hansen | H04B 7/0417 375/130 |
| 8,000,401 B2* | 8/2011 | Lee | H04B 7/0456 370/203 |
| 8,000,421 B2* | 8/2011 | Takano | H04B 7/02 375/349 |
| 8,081,692 B1* | 12/2011 | Zhang | H04L 25/03343 375/260 |
| 8,184,544 B2* | 5/2012 | Ko | H04B 7/0621 370/249 |
| 8,184,728 B1* | 5/2012 | Mahmoud | H04L 27/2634 375/260 |
| 8,223,872 B1* | 7/2012 | Zhang | H04B 7/0417 375/267 |
| 8,229,017 B1* | 7/2012 | Lee | H04B 7/0665 342/432 |
| 8,320,301 B2* | 11/2012 | Walton | H04L 1/0071 370/328 |
| 8,325,844 B2* | 12/2012 | Walton | H04B 7/0417 375/130 |
| 8,340,214 B2* | 12/2012 | Kang | H04L 25/03343 375/232 |
| 8,351,555 B2* | 1/2013 | Semenov | H04B 17/336 375/285 |
| 8,451,932 B2* | 5/2013 | Onggosanusi | H04B 7/0426 375/260 |
| 8,451,944 B2* | 5/2013 | Gaur | H04B 7/0426 375/296 |
| 8,767,860 B2* | 7/2014 | Catreux | H04B 7/0615 375/260 |
| 8,774,310 B2* | 7/2014 | Khan | H04L 5/0023 375/133 |
| 8,831,136 B2* | 9/2014 | Ishikawa | H04B 15/00 375/295 |
| 9,106,324 B1* | 8/2015 | Mahmoud | H04B 15/00 |
| 9,426,010 B1* | 8/2016 | Mahmoud | H04L 27/2601 |
| 9,590,706 B1* | 3/2017 | Frank | H04B 7/0417 |
| 9,590,708 B1* | 3/2017 | Frank | H04B 7/0456 |
| 9,647,736 B1* | 5/2017 | Schelstraete | H04B 7/0452 |
| 9,780,985 B1* | 10/2017 | Tom | H04L 27/2614 |
| 9,793,965 B1* | 10/2017 | Pustovalov | H04B 7/0452 |
| 9,877,668 B1* | 1/2018 | Sarkar | A61B 5/1121 |
| 10,116,370 B2* | 10/2018 | Obara | H04B 7/04 |
| 10,348,530 B1* | 7/2019 | Pekoz | H04B 1/12 |
| 2003/0185309 A1* | 10/2003 | Pautler | H04B 7/0417 375/257 |
| 2003/0218973 A1* | 11/2003 | Oprea | H04B 7/0434 370/210 |
| 2004/0190636 A1* | 9/2004 | Oprea | H04B 7/0417 375/260 |
| 2004/0192218 A1* | 9/2004 | Oprea | H04L 25/03343 455/73 |
| 2005/0094741 A1* | 5/2005 | Kuroda | H04B 7/0421 375/267 |
| 2005/0141631 A1* | 6/2005 | Takano | H04B 7/0417 375/267 |
| 2005/0249304 A1* | 11/2005 | Takano | H04B 7/02 375/267 |
| 2005/0287978 A1* | 12/2005 | Maltsev | H04B 7/0634 455/403 |
| 2006/0008024 A1* | 1/2006 | Wight | H04B 7/0443 375/267 |
| 2006/0039497 A1* | 2/2006 | Vu | H04B 7/0443 375/267 |
| 2006/0071807 A1* | 4/2006 | Sadowsky | H04B 7/0617 340/13.24 |
| 2006/0120478 A1* | 6/2006 | Kim | H04B 7/0617 375/267 |
| 2006/0239374 A1* | 10/2006 | Aldana | H04B 7/0617 375/267 |
| 2006/0245513 A1* | 11/2006 | Koo | G06F 17/16 375/267 |
| 2006/0291544 A1* | 12/2006 | Fischer | H04B 7/0617 375/219 |
| 2007/0147535 A1* | 6/2007 | Niu | H04B 7/0408 375/267 |
| 2007/0160011 A1* | 7/2007 | Kim | H04B 7/0417 370/332 |
| 2007/0172844 A1* | 7/2007 | Lancaster | C12Q 1/6886 435/6.12 |
| 2007/0189151 A1* | 8/2007 | Pan | H04L 1/0009 370/210 |
| 2007/0226287 A1* | 9/2007 | Lin | G06F 7/4818 708/490 |
| 2007/0258392 A1* | 11/2007 | Larsson | H04B 7/0417 370/310 |
| 2008/0080449 A1* | 4/2008 | Huang | H04B 7/0634 370/342 |
| 2008/0080632 A1* | 4/2008 | Kim | H04L 1/0687 375/267 |
| 2008/0108310 A1* | 5/2008 | Tong | H04B 7/0617 455/69 |
| 2008/0165868 A1* | 7/2008 | Kent | H04B 7/0417 375/260 |
| 2008/0165869 A1* | 7/2008 | Kent | H04B 7/0639 375/260 |
| 2008/0192704 A1* | 8/2008 | Kent | H04B 7/0417 370/335 |
| 2008/0219366 A1* | 9/2008 | Lau | H04L 1/0001 375/260 |
| 2008/0232501 A1* | 9/2008 | Khojastepour | H04B 7/0417 375/267 |
| 2008/0317156 A1* | 12/2008 | Sivanesan | H04B 7/0413 375/267 |
| 2009/0143017 A1* | 6/2009 | Barak | H04B 7/0413 455/65 |
| 2009/0161646 A1* | 6/2009 | Li | H04B 7/0417 370/342 |
| 2009/0207078 A1* | 8/2009 | Fletcher | H04B 7/043 342/377 |
| 2010/0008406 A1* | 1/2010 | Sawai | H04L 25/03006 375/219 |
| 2010/0254474 A1* | 10/2010 | Gomadam | H04B 7/0417 375/267 |
| 2010/0305058 A1* | 12/2010 | Lancaster | C12Q 1/6886 514/34 |
| 2010/0316163 A1* | 12/2010 | Forenza | H04B 7/024 375/296 |
| 2011/0058599 A1* | 3/2011 | Gaur | H04B 7/0452 375/233 |
| 2011/0199935 A1* | 8/2011 | Sahara | H04B 17/12 370/252 |
| 2011/0243045 A1* | 10/2011 | Dao | H04B 7/0452 370/310 |
| 2012/0014415 A1* | 1/2012 | Su | H04B 7/043 375/140 |

(56) References Cited

U.S. PATENT DOCUMENTS

| | | | |
|---|---|---|---|
| 2012/0027048 A1* | 2/2012 | Lindoff | H04L 25/03006 375/140 |
| 2012/0082256 A1* | 4/2012 | Gaur | H04B 7/0426 375/260 |
| 2012/0140834 A1* | 6/2012 | Choi | H04B 7/0482 375/260 |
| 2012/0214404 A1* | 8/2012 | Shany | H04K 3/43 455/1 |
| 2012/0275411 A1* | 11/2012 | Kim | H04L 5/0032 370/329 |
| 2012/0307926 A1* | 12/2012 | Kuo | H04B 7/024 375/267 |
| 2012/0314590 A1* | 12/2012 | Choudhury | H04B 7/0452 370/252 |
| 2015/0016379 A1* | 1/2015 | Nam | H04B 7/0456 370/329 |
| 2015/0063482 A1* | 3/2015 | Zhou | H04B 7/0482 375/267 |
| 2016/0156401 A1* | 6/2016 | Onggosanusi | H04B 7/0478 370/329 |
| 2017/0180020 A1* | 6/2017 | Namgoong | H04B 7/0456 |
| 2017/0324455 A1* | 11/2017 | Soriaga | H04W 76/10 |
| 2018/0098718 A1* | 4/2018 | Sarkar | A61B 5/1121 |
| 2018/0139081 A1* | 5/2018 | Guvenkaya | H04L 25/03828 |
| 2018/0152229 A1* | 5/2018 | Hafez | H01Q 3/40 |
| 2018/0211033 A1* | 7/2018 | Aditham | G06F 21/316 |
| 2019/0097709 A1* | 3/2019 | Joetten | H04B 7/0456 |
| 2019/0280905 A1* | 9/2019 | Pekoz | H04B 1/1027 |

OTHER PUBLICATIONS

Goel and Negi. Guaranteeing Secrecy using Artificial Noise. IEEE Transactions on Wireless Communications. 2008. vol. 7 (No. 6): 2180-2189.

Tian et al., Hybrid Precoder and Combiner Design for Secure Transmission in mmWave MIMO Systems. IEEE Global Communications Conference (Globecom 2017). 2017: 1-6.

Zhu et al., Artificial Noise Generated in MIMO Scenario: Optimal Power Design. IEEE Signal Processing Letters. 2013. vol. 20 (No. 10): 964-967.

* cited by examiner

USING ARTIFICIAL SIGNALS TO MAXIMIZE CAPACITY AND SECRECY OF MULTIPLE-INPUT MULTIPLE-OUTPUT (MIMO) COMMUNICATION

FEDERALLY SPONSORED RESEARCH OR DEVELOPMENT

This invention was made with Government support under Grant No. 1609581 awarded by the National Science Foundation. The government has certain rights in the invention.

CROSS-REFERENCE TO RELATED APPLICATIONS

This application claims priority to U.S. Provisional Patent Application No. 62/682,421 filed on Jun. 8, 2018, entitled "Using Artificial Noise to Maximize Capacity and Secrecy of MIMO Transmitters that Use Analog/Hybrid/Codebook Based Digital Precoders", which is incorporated by reference herein in its entirety.

BACKGROUND OF THE INVENTION

In a theoretical, ideal, Multiple-Input Multiple-Output (MIMO) antenna system, comprising multiple transmitting antenna at a transmitter and multiple receiving antenna at a receiver, after learning the channel matrix H between the transmitter and the receiver, the transmitter decomposes the channel matrix to its singular values:

$$H = U\Lambda V^*$$

Where the ith row and jth column of H contains the flat fading channel coefficient between the ith receiver and jth transmitter antenna, and $\Lambda$ is a diagonal matrix containing the singular values of H on its main diagonal. Using this decomposition, the transmitter precodes the Quadrature Amplitude Modulation (QAM symbols), $\tilde{x}$ by left multiplication with the V matrix to obtain the transmitted signal x. Namely, $x = V\tilde{x}$ is the signal fed to the antennas which passes through the transmission channel.

After receiving the transmitted signal, the receiver performs the post processing by left multiplication with $U^*$, effectively creating:

$$\hat{y} = \hat{\tilde{x}} = U^* H V \tilde{x}$$

$$\hat{y} = \hat{\tilde{x}} = U^* U \Lambda V^* V \tilde{x}$$

$$\hat{y} = \hat{\tilde{x}} = \Lambda \tilde{x}$$

Wherein, $\tilde{x}$ is the data symbols, V is the pre-processing matrix obtained from the singular value decomposition (SVD) of the channel matrix, x is the vector of signals fed to the transmitter antenna, y is the column of observations at the receiver antenna, $U^*$ is the post-processing matrix based on the channel and $\hat{y}$ is the estimated data symbols that are obtained by post-processing the observations ($\hat{y} = \Lambda \tilde{x}$).

If analog, codebook based digital or hybrid beamforming is used in a MIMO system, the pre-processing matrix V and the post-processing matrix $U^*$ can only be chosen from a set of pre-determined matrix pairs, hereinafter referred to as the matrix dictionary. Since the matrix pairs in the dictionary do not match the channel counterparts, the channel cannot be decomposed to its singular values completely and there are mismatches between the precoder/combiner and the actual transmission channel. This mismatch reduces the capacity of the MIMO channel. Furthermore, since only a finite set of known precoder/combiner matrices are used, an eavesdropper can obtain the transmitted signal correctly by brute-force searching all combiners in the set.

Accordingly, what is needed in the art is an improved system and method that increases the capacity of a MIMO transmission channel, while also providing for secrecy of the communication over the channel.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

In various embodiments, the present invention provides a system and method that utilizes artificial signals to maximize capacity and secrecy of MIMO transmitters that utilize digital beamforming to communicate in an analog/codebook based digital/hybrid MIMO communication system. In accordance with the present invention, the transmitted signal is generated using a convex optimization that minimizes the effects of the mismatch between the multiple antenna communication channels and the quantized precoding and combining operations. In this context, quantization refers to quantization of an infinite number of possible channel matrices to a finite set of precoding/combining matrices, and is not related to quantization of analog signals, as used widely in the electrical engineering literature.

In one embodiment, the present invention provides a codebook-based multiple-input multiple-output (MIMO) transmission method. The method includes, selecting a precoding/combining matrix pair, wherein the precoding/combining matrix pair is selected based upon an estimated channel coefficient of a transmission channel between a MIMO transmitter and a MIMO receiver. The method further includes, generating an artificial signal from an information signal to be transmitted by the MIMO transmitter, wherein the artificial signal minimizes an error between the information signal and the signal recovered by the MIMO receiver following the application of a combining operation based upon the precoding/combining matrix pair.

In the present invention, the estimated channel coefficient of the transmission channel is a matrix comprising an estimated channel coefficient between each transmitter and receiver antenna pair at the MIMO transmitter and either the MIMO transmitter or the MIMO receiver estimates the channel coefficient of the transmission channel between each one of a plurality of pairs of MIMO transmitting and receiving antennas and then selects the precoding/combining matrix pair that maximizes a capacity of the transmission channel based upon the estimated channel coefficient and notifies the communication counterpart of this choice.

Additionally, the artificial signal is generated by performing convex optimization, wherein the artificial signal is designed to match desired data symbols as much as possible upon transmitting the plurality of artificial signals and after applying the combining matrix to the plurality of received artificial signals at the desired receiver, while being limited by a power limitation.

In additional embodiment, the present invention provides a codebook based multiple input multiple output (MIMO) transmitter for increasing the capacity of the (MIMO) system and for providing secrecy. The MIMO transmitter includes, a signal processing unit for receiving a precoding/combining matrix pair, wherein the precoding/combining matrix pair is based upon an estimated channel coefficient of a transmission channel. The signal processing unit is further for generating an artificial signal from an information signal to be transmitted by the MIMO transmitter, wherein the artificial signal minimizes an error between the information signal and the signal recovered by the MIMO receiver following the application of a combining operation based upon the precoding/combining matrix pair.

In this embodiment, the estimated channel coefficient of the transmission channel is a matrix comprising an estimated channel coefficient between each transmitter and receiver antenna pair at the MIMO transmitter. In an exemplary embodiment, the signal processing unit may be a modem.

In another embodiment, the present invention provides one or more non-transitory computer-readable media having computer-executable instructions for performing a method of running a software program on a computing device, the computing device operating under an operating system. When executed at an MIMO transmitter, the instructions from the software program include, receiving a precoding/combining matrix pair from a MIMO receiver, wherein the precoding/combining matrix pair is based upon an estimated channel coefficient of a transmission channel, generating an artificial signal from an information signal to be transmitted by the MIMO transmitter, wherein the artificial signal minimizes an error between the information signal and the signal recovered by the MIMO receiver following the application of a combining operation based upon the precoding/combining matrix pair.

In the present invention, the implemented algorithm is backward compatible with legacy standards and receivers and the modifications are performed exclusively at the transmitting device, which transmits a signal that is designed to be received by legacy devices.

In addition, enhanced performance of the MIMO system can be realized modifying only the software, or the signal processing unit (modem), at the transmitting device to utilize the introduced algorithm without requiring modification of the receiving hardware.

By employing the method of the present invention at a MIMO transmitter, the spectral efficiency of the transmission channel is increased, thereby allowing faster data rates, increased connectivity and lower energy consumption. Additionally, the secrecy of the communication channel increases, as the transmitted signal is tailored to the transmission channel of the intended receiver.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the invention, reference is made to the accompanying drawings, which form a part thereof, and within which are shown by way of illustration specific embodiments by which the invention may be practiced. It is to be understood that other embodiments may be utilized, and structural changes may be made without departing from the scope of the invention.

MIMO transmitters are known that perform precoding prior to transmission to a MIMO receiver. The MIMO transmitter may estimate the transmission channel and then select one precoding/combining matrix pair from a number of predefined precoding/combining matrix pairs provided by a codebook, based upon the estimate of the transmission channel. The precoding/combining matrices are unitary, and the preceding matrix selected is the one which will maximize the capacity based on the estimate of the transmission channel. The MIMO transmitter provides the selected precoding/combining matrix pair identifier to the MIMO receiver. The MIMO transmitter then applies the selected precoding matrix to a signal prior to transmission of the signal over the transmission channel to the receiving antennae.

In various embodiments, the present invention utilizes a set of Multiple-Input Multiple-Output (MIMO) transmitter precoding (and corresponding receiver combining) matrices with finite cardinality. Knowing the exact channel coefficients between each transmitter and receiver antenna at the MIMO transmitter, the method of the present invention calculates the artificial signal that minimizes the Euclidean distance between the desired and received processed data symbols. In some embodiments, the artificial signal is then fed to the precoder, instead of the actual desired data symbols. In some embodiments, the artificial signal is fed directly to the MIMO transmitters antenna, eliminating the need for precoding operation whenever possible.

The present invention addresses the issue of quantization error in MIMO systems. In this context, quantization refers to quantization of an infinite number of possible channel matrices to a finite set of precoding/combining matrices, and is not related to quantization of analog signals, as used widely in the electrical engineering literature.

In practical scenarios using analog/hybrid and digital codebook-based precoders and combiners, few samples are chosen from the infinitely many possible V and corresponding U matrices. These samples are predefined as a dictionary at both ends of the transmission channel and only these sample matrices are used at all times. Referring to the ith predefined precoder/combiner pair as $V_i$ and $U_i$, where $i \in \{1, 2, \ldots, 1\}$; $1 \ll \infty$. These precoders and combiners can then be realized using many methods, including but not limited to, (1) Digital Signal Processing (DSP) programs, in the case of codebook based digital precoding, (2) DSP programs with an RF switch, in the case of analog/digital hybrid precoding, (3) Phase shifters, in the case of analog precoding, (4) Forming special antenna array patterns, in the case of antenna array analog precoding, and (5) Forming special antenna array patterns coupled with optical lenses, in the case of lens aided antenna array precoding.

Because $V_i \neq V$ and $U_i \neq U$, and having the practical post-processing output, there is an additional error term:

$$\tilde{y} = U_i^* U \Lambda V_i \tilde{x}$$

$$\tilde{y} = \Lambda \tilde{x} + \epsilon$$

$$\epsilon = U_i^* U \Lambda V^* V_i \tilde{x} - U^* U \Lambda V^* V \tilde{x}$$

$$\epsilon = (U_i^* - U^*) U \Lambda V^* (V_i - V) \tilde{x}$$

Where $\tilde{x}$ is the information symbols, $\tilde{y}$ is the post-processing output, $\epsilon$ is the error due to the mismatch between precoder/combiner matrix pair and the actual SVD components of the channel. Throughout this document, U and V will be used to refer to the actual components of the SVD of the channel, and $U_i$ and $V_i$ will be used to refer to the predefined precoders and combiners that are used during the transmission.

In a first embodiment, adding artificial signals to data symbols that forces the error to be zero is examined. In this embodiment, adding an artificial signal n to the information symbols $\tilde{x}$, prior the precoder, is proposed, such that $\epsilon$ is reduced, i.e.

$$x = V_i (\tilde{x} + n)$$

In this first embodiment, $n = n_{ZF}$ where $$U_i^* U \Lambda V^* V_i n_{ZF} = -\epsilon$$

$$U_i^* U \Lambda V^* V_i n_{ZF} = -(U_i^* - U^*) U \Lambda V^* (V_i - V) \tilde{x}$$

$$n_{ZF} = -(U_i^* H V_i)^{-1} (U_i^* - U^*) H (V_i - V) \tilde{x}$$

However, as in all zero forcing cases, this operation is not power limited and as such, may yield artificial signal vectors having power that is greater than the power of the signal itself, which cannot be transmitted.

In a second embodiment, adding power limited artificial signals to the data symbols, wherein the power limited artificial signal is obtained using convex optimization, is considered.

In this second embodiment, to prevent the unlimited power case and limit the transmitted power, one can also compute and add the artificial signal that does not completely eliminate, but minimizes, the mean of the square of $\epsilon$, such that the power of the vector input to the precoder of the transmitter is unity. Then, the power is divided between the actual signal and the artificial signal. If the actual signal power is limited to $1-\alpha$ and the artificial signal power is limited to $\alpha$, then:

$$n = \underset{\tilde{n}}{\operatorname{argmin}} \left\| U_i^* U \Lambda V^* V_i^* \left[ \sqrt{(1-\alpha)} \tilde{x} + \sqrt{\alpha} \, \tilde{n} \right] - \Lambda \tilde{x} \right\|_2$$

subject to $\|\tilde{n}\|_2 \leq \sqrt{N}$

Where n is the artificial signal to be added to the ideal signal and N is the number of transmitting antennae of the MIMO transmitter. In this embodiment, the optimization is convex and is practically highly feasible.

However, the power of the artificial signal ($\alpha$) also needs to be optimized. Accordingly, two additional embodiments are proposed wherein only the artificial signal is shaped and transmitted and the actual data signals are not part of the output.

In this third and fourth embodiments, the signal fed to the precoder of the MIMO transmitter is solely $\tilde{n}$, that is, $x = V_i \tilde{n}$, where x is the signal fed to the transmitter antennae. The artificial signal is designed to look exactly like the desired data symbols after the precoding, channel and post-processing transformation. This way, the equations become easier to solve with fewer parameters involved.

As such, the third embodiment proposes transmitting artificial signal that eliminates the error. Similar to the first embodiment, equality of the practical output and the ideal output is forced, namely:

$$U_i^* U \Lambda V^* V_i \tilde{n}_{ZF} = U^* U \Lambda V^* V \tilde{x}$$

$$\tilde{n}_{ZF} = (U_i^* U \Lambda V^* V_i)^{-1} U^* H V \tilde{x}$$

$$\tilde{n}_{ZF} = (U_i^* H V_i)^{-1} \Lambda \tilde{x}$$

However, similar to the first embodiment, the power of $\tilde{n}_{ZF}$ is unlimited in this case and this cannot be practically used. Taking the same approach as in the second embodiment to limit the power, a practical case in the fourth embodiment is provided.

The previously described first, second and third embodiments can be implemented to solve the problem as described. However, these embodiments are considered to provide a solution that exhibits lower performance and higher complexity. The following fourth and fifth embodiments of the present invention provide a high performing solution having a reduced complexity.

The fourth embodiment proposes transmitting power limited artificial signals that minimizes the error. As such, in the present invention, the ultimate solution is to design the artificial signal with power constraints such that the error is minimized at the receiver is designed as:

$$x = \operatorname*{argmin}_{\tilde{n}} \|U_i^* U \Lambda V^* V_i \tilde{n} - \Lambda \tilde{x}\|_2 \text{ subject to } \|\tilde{n}\|_2 \leq \sqrt{N}$$

Where ñ is the vector of signals fed to the precoder so that the power-limited signal yielding the minimum error to the ideal input at the output is designed.

So that the power-limited signal yielding the minimum error to the ideal input at the output is designed, without the need to optimize any additional parameters.

Furthermore, in case of full digital beamforming, if the precoding operation is performed completely in software and not using a fixed hardware, the artificial signal is designed in the fifth embodiment as:

$$\tilde{n} = \operatorname*{argmin}_{\tilde{n}} \|U_i^* U \Lambda V^* \tilde{n} - \Lambda \tilde{x}\|_2 \text{ subject to } \|\tilde{n}\|_2 \leq \sqrt{N}$$

Where x is the vector of signals fed to the antennae. Compared to the fourth embodiment, this embodiment of the present invention reduces computational complexity, power consumption and processing delay without any change in performance. If precoding is applied using a fixed hardware, the fourth embodiment may still be used by applying only a software upgrade to devices that are already produced and in use.

Figure 1A:
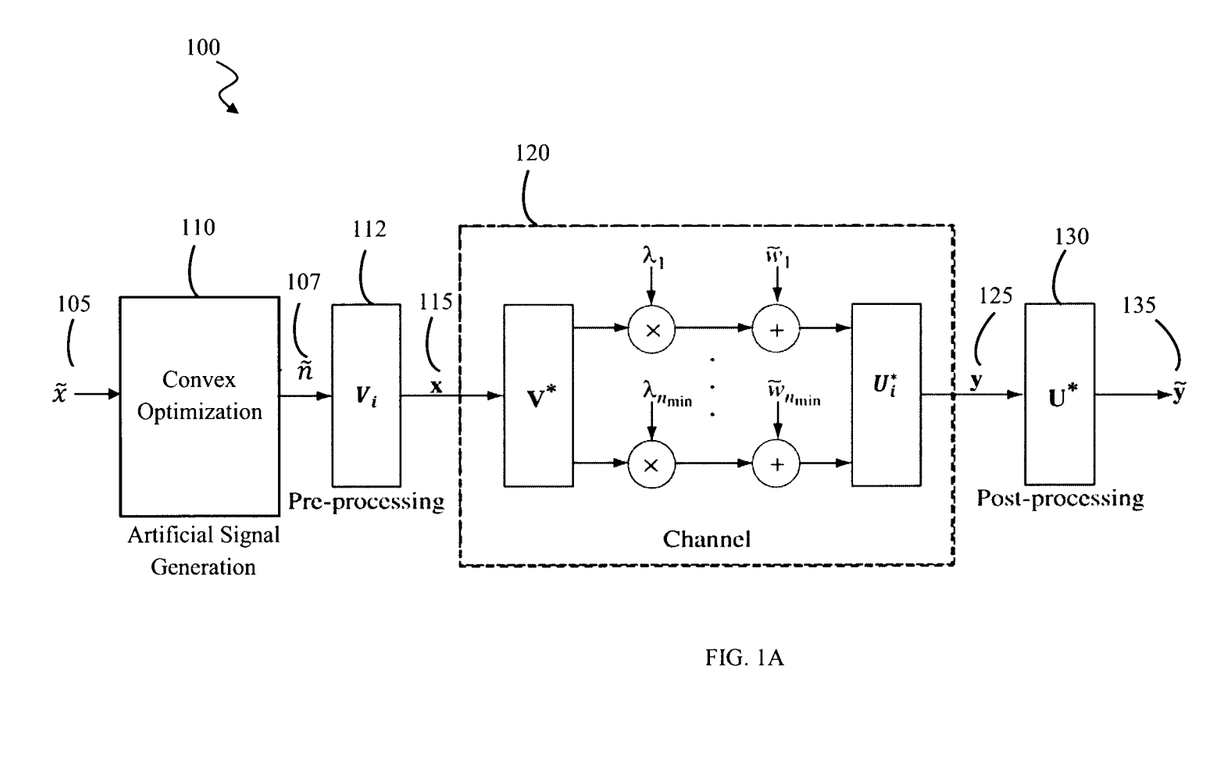
FIG. 1A is a block diagram illustrating the operation of a MIMO radio antenna system which includes precoding of the artificial signal, in accordance with an embodiment of the present invention.

FIG. 1A illustrates a precoded/decoded MIMO block diagram 100 in accordance with an embodiment of the present invention, wherein precoding of the artificial signal is performed prior to transmission of the artificial signal over the transmission channel. Wherein, x̃ 105 is the actual information symbols to be transmitted to the MIMO receiver and ñ 107 is the artificial signal generated by the MIMO transmitter according to the method as described in the fourth embodiment of the present invention. The convex optimization module 110 is used to generate the artificial signal ñ 107. $V_i$ 112 is the pre-processing matrix, which is the precoding matrix. x 115 is the vector of signals fed to the transmitter antennae to be transmitted over the transmission channel 120. y 125 is the column of observations at the receiver antenna following transmission over the transmission channel 120. $U_i^*$ 130 is the post-processing matrix based on the channel and ỹ 135 is the estimated data symbols that are obtained by post-processing the observations (ỹ=Λx̃).

Figure 1B:
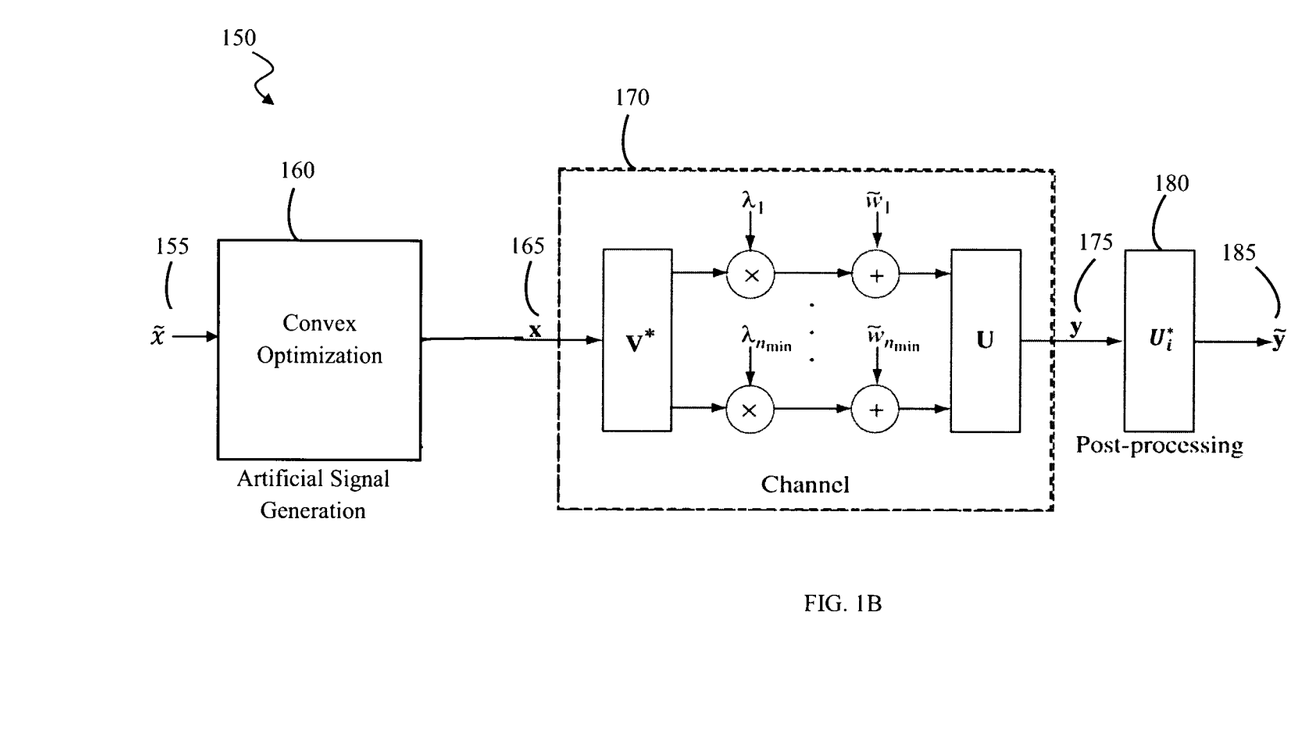
FIG. 1B is a block diagram illustrating the operation of a MIMO radio antenna system, without precoding of the artificial signal, in accordance with an embodiment of the present invention.

FIG. 1B illustrates a precoded/decoded MIMO block diagram 150 in accordance with a fifth embodiment of the present invention, wherein no precoding of the artificial signal is performed prior to transmission of the artificial signal over the transmission channel. Wherein, x̃ 155 is the actual information symbols to be transmitted to the MIMO receiver by the MIMO transmitter. The convex optimization module 160 is used to generate the artificial signal x 165 according to the method of the present invention which is then fed to the transmitter antennae to be transmitted over the transmission channel 170. y 175 is the column of observations at the receiver antenna following transmission over the transmission channel 170. $U_i^*$ 180 is the post-processing matrix and ỹ 185 is the estimated data symbols that are obtained by post-processing the observations (ỹ=Λx̃). The convex optimization module 160 is used to generate the artificial signal x 165 according to the method of the present invention which is then fed to the transmitter antennae to be transmitted over the transmission channel 170. y 175 is the column of observations at the receiver antenna following transmission over the transmission channel 170. U 180 is the post-processing matrix and ỹ 185 is the estimated data symbols that are obtained by post-processing the observations (ỹ=Λx̃).

Figure 2:
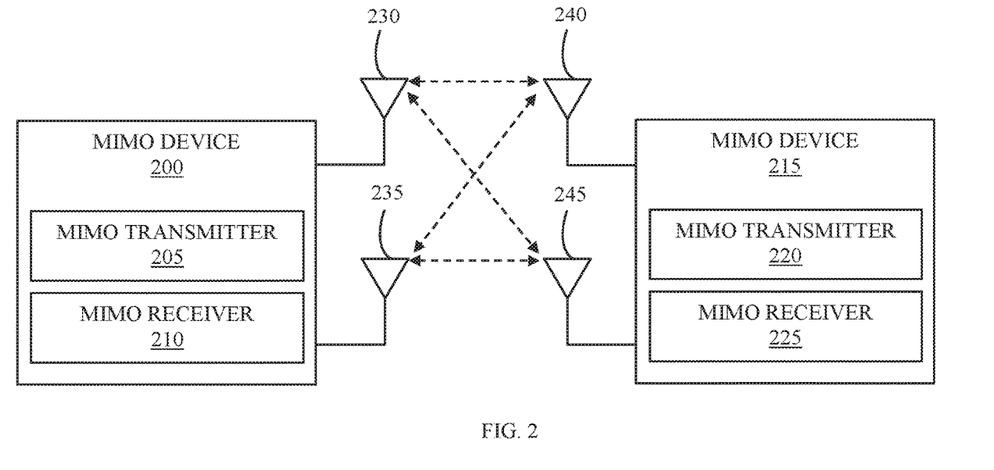
FIG. 2 is a block diagram illustrating a pair of MIMO devices implementing the artificial signal scheme, in accordance with an embodiment of the present invention.

FIG. 2 illustrates a pair of Multiple-Input Multiple-Output (MIMO) devices implementing the artificial signal scheme, according to one embodiment of the present invention. As illustrated, a first MIMO device 200 includes a MIMO transmitter 205, a MIMO receiver 210 and a number of antennae 230, 235. The antennae 230, 235 are shared by the MIMO transmitter 205 and the MIMO receiver 210. A second MIMO device 215 also includes a MIMO transmitter 220 and a MIMO receiver 225, which share antennae 240, 245.

In operation, the MIMO transmitter 205 of the MIMO device 200 applies precoding based on feedback received by the MIMO receiver 210 of the MIMO device 200 from the MIMO transmitter 220 of the MIMO device 215. As previously described, in the present invention, the MIMO transmitter 205 generates an artificial signal by performing convex optimization, wherein the artificial signal is designed to match desired data symbols after applying the combining matrix to the plurality of received artificial signals. Depending upon the embodiment being implemented, precoding may then be applied to this artificial signal which is then transmitted over the transmitting antennae 230, 235 of the first MIMO device 200 to the receiving antennae 240, 245 of the second MIMO device 215, for subsequent reception by the MIMO receiver 225.

Figure 3:
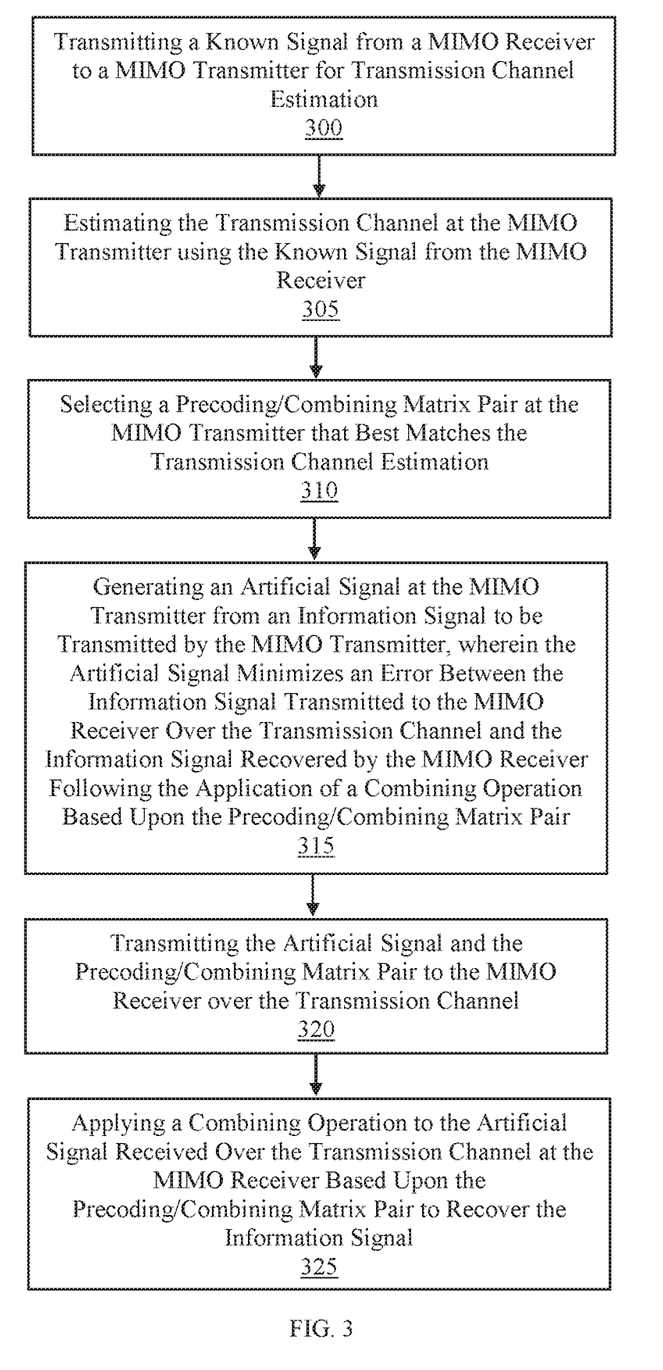
FIG. 3 is a flow diagram illustrating the methods steps for artificial signal transmission in a codebook-based MIMO system, where the precoding/combining matrix pair is selected by the MIMO transmitter and no precoding of the artificial signal is performed, in accordance with an embodiment of the present invention.

FIG. 3 illustrates a flow diagram of the method operating a codebook-based multiple-input multiple-output (MIMO) transmitter, in accordance with the present invention and current standard communication protocols. In this implementation, the precoding/combining matrix is selected by the MIMO transmitter and no precoding of the artificial signal is performed prior to transmission of the artificial signal to the MIMO receiver. The method includes the steps of, transmitting a known signal from a MIMO receiver to a MIMO transmitter for transmission channel estimation 300 and estimating the transmission channel at the MIMO transmitter using the known signal from the MIMO receiver 305. The method further includes, selecting a precoding/combining matrix pair at the MIMO transmitter that best matches the transmission channel estimation 310. The method continues at step 315, wherein the MIMO transmitter generates an artificial signal from an information signal to be transmitted by the MIMO transmitter, wherein the artificial signal minimizes an error between the information signal transmitted to the MIMO receiver over the transmission channel and the information signal recovered by the MIMO receiver following the application of a combining operation based upon the precoding/combining matrix pair. The method continues by transmitting the artificial signal and the precoding/combining matrix pair to the MIMO receiver over the transmission channel 320. The MIMO receiver then applies the combining operation to the artificial signal based upon the precoding/combining matrix pair to recover the information signal 325.

Figure 4:
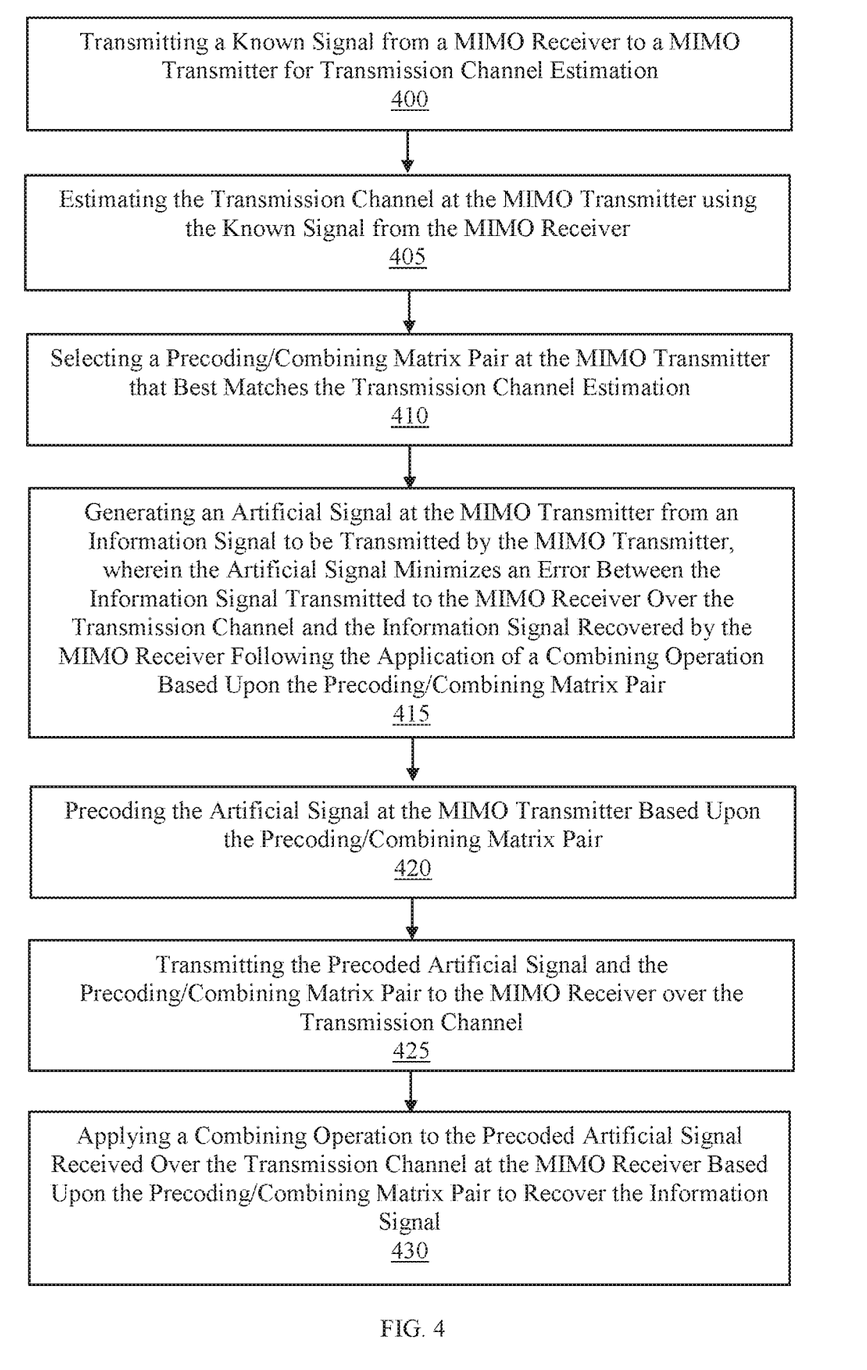
FIG. 4 is a flow diagram illustrating the methods steps for artificial signal transmission in a codebook-based MIMO system, where the precoding/combining matrix pair is selected by the MIMO transmitter and precoding of the artificial signal is performed, in accordance with an embodiment of the present invention.

In an additional embodiment of the present invention, illustrated with reference to FIG. 4, the precoding/combining matrix is selected by the MIMO transmitter and precoding of the artificial signal is performed prior to transmission of the artificial signal to the MIMO receiver. The method includes the steps of, transmitting a known signal from a MIMO receiver to a MIMO transmitter for transmission channel estimation 400 and estimating the transmission channel at the MIMO transmitter using the known signal from the MIMO receiver 405. The method further includes, selecting a precoding/combining matrix pair at the MIMO transmitter that best matches the transmission channel estimation 410. The method continues at step 415, wherein the MIMO transmitter generates an artificial signal from an information signal to be transmitted by the MIMO transmitter, wherein the artificial signal minimizes an error between the information signal transmitted to the MIMO receiver over the transmission channel and the information signal recovered by the MIMO receiver following the application of a combining operation based upon the precoding/combining matrix pair. The method continues at step 420, wherein the MIMO transmitter performs precoding of the artificial signal prior to transmitting the artificial signal and the precoding/combining matrix pair to the MIMO receiver over the transmission channel 425. The MIMO receiver then applies the combining operation to the precoded artificial signal based upon the preceding/combining matrix pair to recover the information signal 430.

Figure 5:
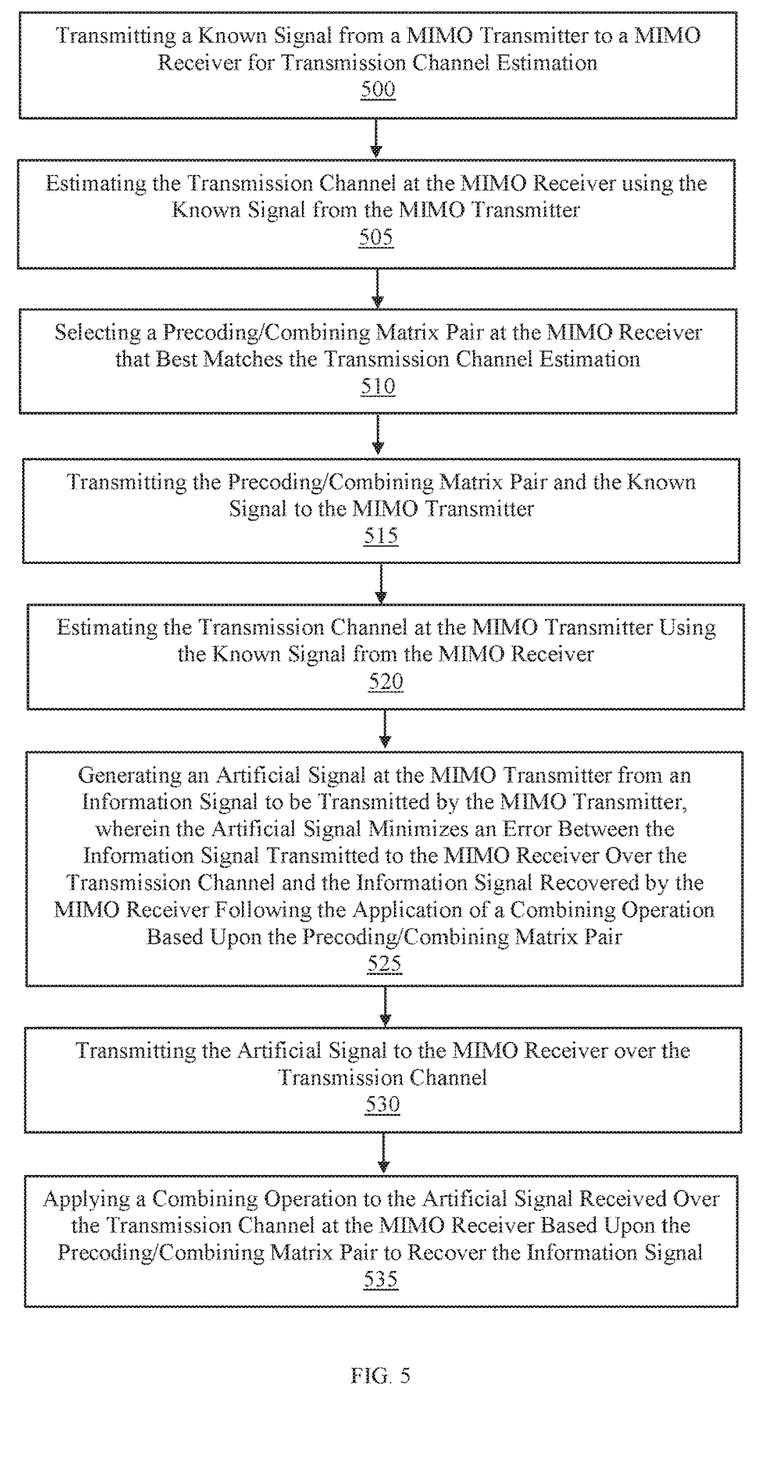
FIG. 5 is a flow diagram illustrating the methods steps for artificial signal transmission in a codebook-based MIMO system, where the precoding/combining matrix pair is selected by the MIMO receiver and no precoding of the artificial signal is performed, in accordance with an embodiment of the present invention.

In another embodiment of the present invention, illustrated with reference to FIG. 5, the precoding/combining matrix is selected by the MIMO receiver and no precoding of the artificial signal is performed prior to transmission of the artificial signal to the MIMO receiver. The method includes the steps of, transmitting a known signal from a MIMO transmitter to a MIMO receiver for transmission channel estimation 500 and estimating the transmission channel at the MIMO receiver using the known signal from the MIMO receiver 505. The method further includes, selecting a precoding/combining matrix pair at the MIMO receiver that best matches the transmission channel estimation 510. The method continues at step 515, wherein the MIMO receiver transmits the precoding/combining matrix pair and the known signal to the MIMO transmitter. The MIMO transmitter then estimates the transmission channel using the known signal from the MIMO receiver 520. The method continues at step 525, wherein the MIMO transmitter generates an artificial signal from an information signal to be transmitted by the MIMO transmitter, wherein the artificial signal minimizes an error between the information signal transmitted to the MIMO receiver over the transmission channel and the information signal recovered by the MIMO receiver following the application of a combining operation based upon the precoding/combining matrix pair. The method continues at step 530, wherein the MIMO transmitter transmits the artificial signal to the MIMO receiver over the transmission channel. The MIMO receiver then applies the combining operation to the artificial signal based upon the precoding/combining matrix pair to recover the information signal 535.

Figure 6:
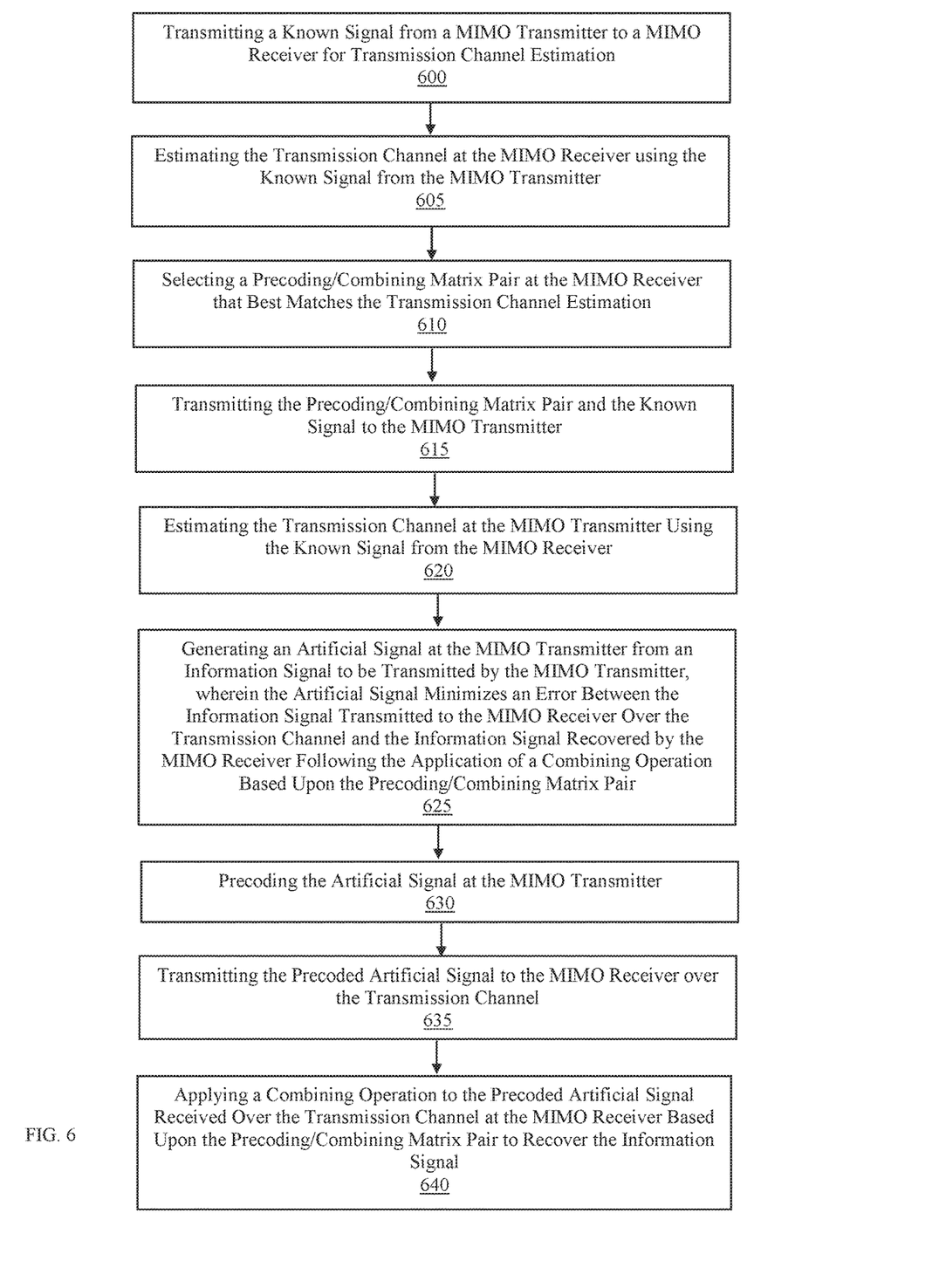
FIG. 6 is a flow diagram illustrating the methods steps for artificial signal transmission in a codebook-based MIMO system, where the precoding/combining matrix pair is selected by the MIMO receiver and precoding of the artificial signal is performed, in accordance with an embodiment of the present invention.

In an additional embodiment of the present invention, illustrated with reference to FIG. 6, the precoding/combining matrix is selected by the MIMO receiver and precoding of the artificial signal is performed prior to transmission of the artificial signal to the MIMO receiver. The method includes the steps of, transmitting a known signal from a MIMO transmitter to a MIMO receiver for transmission channel estimation 600 and estimating the transmission channel at the MIMO receiver using the known signal from the MIMO receiver 605. The method further includes, selecting a precoding/combining matrix pair at the MIMO receiver that best matches the transmission channel estimation 610. The method continues at step 615, wherein the MIMO receiver transmits the precoding/combining matrix pair and the known signal to the MIMO transmitter. The MIMO transmitter then estimates the transmission channel using the known signal from the MIMO receiver 620. The method continues at step 625, wherein the MIMO transmitter generates an artificial signal from an information signal to be transmitted by the MIMO transmitter, wherein the artificial signal minimizes an error between the information signal transmitted to the MIMO receiver over the transmission channel and the information signal recovered by the MIMO receiver following the application of a combining operation based upon the precoding/combining matrix pair. The method continues at step 630, wherein the MIMO transmitter precodes the artificial signal prior to transmitting the precoded artificial signal to the MIMO receiver over the transmission channel 635. The MIMO receiver then applies the combining operation to the precoded artificial signal based upon the precoding/combining matrix pair to recover the information signal 640.

The present invention provides several benefits, including increased capacity, increased secrecy while requiring no changes at the receiver. Increased capacity is provided because the mutual information between the received data using the proposed system is higher than the legacy systems as the symbols are more similar, thereby increasing capacity. Increased secrecy is provided as conventional schemes yield a finite set of possible precoder outputs as the set of information symbols and the set of precoding matrices are finite, whereas in this case, infinitely many different transmission symbols may be generated.

Figure 7:
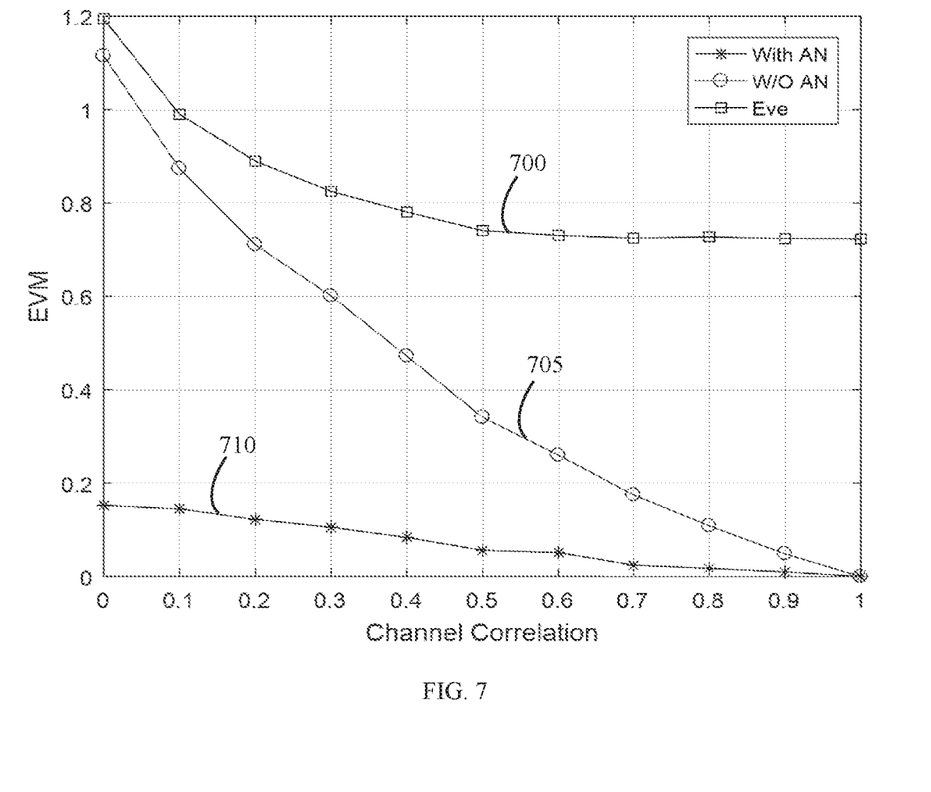
FIG. 7 is a graphical illustration comparing the capacity and secrecy of artificial signal transmission for codebook-based MIMO systems to other solutions known in the art.

FIG. 7 is a graphical illustration of the increase in capacity and secrecy provided by the artificial signal transmission in codebook-based MIMO systems in accordance with the present invention. FIG. 7 shows the error magnitude as it is relates to the similarity between the physical channel between the MIMO transmitter and intended MIMO receiver and the channel induced by practical precoder/combiner; at an eavesdropper 700 and at the desired MIMO receiver 710 if the methods proposed in the present invention are utilized and data is transmitted using the inventive artificial signal, at either the desired MIMO receiver or an eavesdropper if data is transmitted in the conventional manner 705. As illustrated, the error at the desired receiver decreases as a result of the use of the artificial signal which increases capacity of the channel, whereas the error at an eavesdropper increases as a result of the use of the inventive artificial signal which increases the secrecy of the channel.

The predefined precoder and combiners are commonly known. If pure data in the standard form is transmitted, anyone can intercept the pure data and decode it by trying to decode it using all of the combiners defined in the standard. If artificial signal that is defined based on the channel of the intended receiver is transmitted instead of standard data, an eavesdropper of which experienced channel is different from that of the intended receiver will see noise after the standard combination process. This provides physical security, especially for eavesdroppers that are geographically far from the intended receiver.

Because the invention is inherently designed to exploit the imperfections at the receiver, this invention does not require any changes to the receiving device. The receiving device still receives the signal from the predefined combiners, as conventional in the art. The implementation of the invention is at the transmitter only, thereby requiring no modification to the receiver and no changes to the standards. The inventive concept can be implemented at any transmitter that desires to exploit this invention, even by devices that are designed to communicate using standards that are complete.

The primary contribution of the present invention is the formulation of the convex optimization problem with the predetermined precoder/combiners and the actual channel of the desired user. In the present invention, convex formulation allows fast signal design with low power consumption and computational complexity. Additionally, digital formulation makes the invention independent of the hardware platform and universally usable for all hardware configurations. While other known artificial signal (at times referred to as noise) generation algorithms for MIMO communication systems usually separate the desired symbols from the design and use artificial signal to enhance the secrecy of the system, whereby two separate signals are added together and transmitted with different powers, to address two contradicting goals. In contrast, in accordance with the convex optimization solution provided by the present invention, both goals are achieved using a single solution, and a single signal design achieves both goals, simultaneously.

Hardware and Software Infrastructure Examples

The present invention may be embodied on various computing platforms that perform actions responsive to software-based instructions and most particularly on touch-screen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed:
1. A codebook-based multiple-input multiple-output (MIMO) transmission method, the method comprising:
  selecting a precoding/combining matrix pair, wherein the precoding/combining matrix pair is selected based upon an estimated channel coefficient of a transmission channel between a MIMO transmitter and a MIMO receiver;

receiving an information signal at the MIMO transmitter; and generating an artificial signal from the information signal, wherein the artificial signal minimizes an error between the information signal and a signal recovered by the MIMO receiver following application of the combining matrix of the precoding/combing matrix pair to the artificial signal.

2. The method of claim 1, further comprising:

transmitting the artificial signal to the MIMO receiver over the transmission channel; and applying the combining matrix to the artificial signal based upon the precoding/combing matrix pair at the MIMO receiver to recover the information signal.

3. The method of claim 2, further comprising, applying a precoding operation to the artificial signal based upon the precoding/combing matrix pair prior to transmitting the artificial signal to the MIMO receiver.

4. The method of claim 1, further comprising:

transmitting a known signal from the MIMO receiver to the MIMO transmitter;

estimating the channel coefficient at the MIMO transmitter based upon the known signal;

selecting the precoding/combining matrix pair at the MIMO transmitter; and transmitting the selected precoding/combining matrix pair to the MIMO receiver.

5. The method of claim 1, further comprising:

transmitting a known signal from the MIMO transmitter to the MIMO receiver;

estimating the channel coefficient at the MIMO receiver based upon the known signal;

selecting the precoding/combining matrix pair at the MIMO receiver; transmitting the precoding/combining matrix pair and the known signal to the MIMO transmitter; and estimating the channel coefficient at the MIMO transmitter based upon the known signal.

6. The method of claim 1, wherein the estimated channel coefficient of the transmission channel is a matrix comprising an estimated channel coefficient between each transmitter and receiver antenna pair at the MIMO transmitter.

7. The method of claim 1, wherein generating an artificial signal further comprises performing convex optimization to generate the artificial signal.

8. A codebook-based multiple-input multiple-output (MIMO) method, the method comprising:

selecting a precoding/combining matrix pair, wherein the precoding/combining matrix pair is selected based upon an estimated channel coefficient of a transmission channel between a MIMO transmitter and a MIMO receiver;

receiving an information signal at the MIMO transmitter;

generating an artificial signal from the information signal, wherein the artificial signal minimizes an error between the information signal and a signal recovered by the MIMO receiver following application of the combining matrix of the precoding/combing matrix pair to the artificial signal;

transmitting the artificial signal to the MIMO receiver over the transmission channel; and applying the combining matrix to the artificial signal based upon the precoding/combing matrix pair at the MIMO receiver to recover the information signal.

9. The method of claim 8, wherein generating an artificial signal further comprises performing convex optimization to generate the artificial signal.

10. A codebook based multiple input multiple output (MIMO) transmitter, the transmitter comprising:

a signal processing unit for receiving a precoding/combining matrix pair and for receiving an information signal, wherein the precoding/combining matrix pair is based upon an estimated channel coefficient of a transmission channel between a MIMO transmitter and a MIMO receiver; and the signal processing unit further for generating an artificial signal from the information signal, wherein the artificial signal minimizes an error between the information signal and a signal recovered by the MIMO receiver following application of the combining matrix of the precoding/combining matrix pair to the artificial signal.

11. The MIMO transmitter of claim 10, wherein the signal processing unit is further configured for transmitting the artificial signal to the MIMO receiver over the transmission channel for the application of the combining matrix to the artificial signal based upon the precoding/combining matrix pair at the MIMO receiver to recover the information signal.

12. The MIMO transmitter of claim 11, wherein the signal processing unit is further configured for applying a precoding operation to the artificial signal based upon the precoding/combining matrix pair prior to transmitting the artificial signal to the MIMO receiver.

13. The MIMO transmitter of claim 10, wherein the signal processing unit is further configured for:

receiving a known signal from a MIMO receiver over the transmission channel;

estimating the channel coefficient based upon the known signal;

selecting the precoding/combining matrix pair; and transmitting the selected precoding/combining matrix paid to the MIMO receiver.

14. The MIMO transmitter of claim 10, wherein the signal processing unit is further configured for:

transmitting a known signal to the MIMO receiver over the transmission channel;

receiving the precoding/combining matrix from the MIMO receiver based upon the known signal; and estimating the channel coefficient based upon the known signal.

15. The MIMO transmitter of claim 10, wherein the estimated channel coefficient of the transmission channel is a matrix comprising an estimated channel coefficient between each transmitter and receiver antenna pair at the MIMO transmitter.

16. The MIMO transmitter of claim 10, wherein generating an artificial signal further comprises performing convex optimization to generate the artificial signal.

17. The MIMO transmitter of claim 10, wherein the signal processing unit is a modem.

18. One or more non-transitory computer-readable media having computer-executable instructions for performing a method of running a software program on a computing device, the computing device operating under an operating system, the method including issuing instructions from the software program comprising:

selecting a precoding/combining matrix pair, wherein the precoding/combining matrix pair is selected based upon an estimated channel coefficient of a transmission channel between a MIMO transmitter and a MIMO receiver;

receiving an information signal at the MIMO transmitter;

generating an artificial signal from the information signal, wherein the artificial signal minimizes an error between the information signal and a signal recovered by the MIMO receiver following application of the combining matrix of the precoding/combing matrix pair to the artificial signal.

19. The non-transitory computer-readable media of claim 18, wherein the estimated channel coefficient of the transmission channel is a matrix comprising an estimated channel coefficient between each transmitter and receiver antenna pair at the MIMO transmitter.

20. The non-transitory computer-readable media of claim 18, wherein generating an artificial signal further comprises performing convex optimization to generate the artificial signal.

* * * * *

UNITED STATES PATENT AND TRADEMARK OFFICE
CERTIFICATE OF CORRECTION

PATENT NO.          : 10,516,452 B1
APPLICATION NO.     : 16/239372
DATED               : December 24, 2019
INVENTOR(S)         : Berker Pekoz et al.

It is certified that error appears in the above-identified patent and that said Letters Patent is hereby corrected as shown below:

Column 13, Claim 1, Line 10 should read:
matrix of the precoding/combining matrix pair to the Column 13, Claim 2, Line 16 should read:
based upon the precoding/combining matrix pair at the Column 13, Claim 3, Line 20 should read:
precoding/combining matrix pair prior to transmitting the Column 13, Claim 8, Line 61 should read:
matrix of the precoding/combining matrix pair to the Column 13, Claim 8, Line 66 should read:
based upon the precoding/combining matrix pair at the

Column 14, Claim 10, Line 17 should read:
of the precoding/combining matrix pair to the artificial Column 14, Claim 11, Line 23 should read:
artificial signal based upon the precoding/combining matrix Column 14, Claim 13, Line 38 should read:
pair to the MIMO receiver.

Column 15, Claim 18, Line 6 should read:
matrix of the precoding/combining matrix pair to the Signed and Sealed this
Twenty-fifth Day of February, 2020

Andrei Iancu
*Director of the United States Patent and Trademark Office*